United States Patent [19]

Berenson

[11] 4,109,288

[45] Aug. 22, 1978

[54] OVERLOAD PROTECTION SYSTEM

[75] Inventor: Sidney G. Berenson, Poway, Calif.

[73] Assignee: NCR Corporation, Dayton, Ohio

[21] Appl. No.: 748,991

[22] Filed: Dec. 9, 1976

[51] Int. Cl.² .............................................. H02H 9/00
[52] U.S. Cl. ..................................... 361/58; 307/237;
318/221 B; 323/9; 361/35
[58] Field of Search ....................... 361/58, 23, 29, 31,
361/35, 154, 159; 318/221 B; 307/237, 252 UA;
323/9

[56] References Cited

U.S. PATENT DOCUMENTS

| 2,607,029 | 8/1952 | Kesselring | 361/58 |
|---|---|---|---|
| 3,112,435 | 11/1963 | Barney | 361/58 |
| 3,569,999 | 3/1971 | Pascente | 307/252 UA |
| 3,902,080 | 8/1975 | St. Clair et al. | 307/252 UA |

OTHER PUBLICATIONS

"Power Supply Switch" by T. D. Korany, *IBM Tech. Disc. Bulletin* vol. 10, No. 8, 1/68, pp. 1138–1139.

*Primary Examiner*—Gerald Goldberg
*Attorney, Agent, or Firm*—J. T. Cavender; Edward Dugas; Stephen F. Jewett

[57] ABSTRACT

There is provided a protection system for an inductive load of the type having a ferromagnetic core. The system is comprised of a current limiting resistance serially coupled to the load. A zero crossover detection device, having an input and an output, is adapted to couple an A.C. voltage source to the load when the A.C. voltage is at or near the zero crossover point in its cycle. A switch having an open and a closed state is connected in shunt across the current limiting resistance and is actuated by the output from the zero crossover device so as to maintain the switch in an open state during an initial portion of the A.C. voltage cycle.

2 Claims, 4 Drawing Figures

OVERLOAD PROTECTION SYSTEM

BACKGROUND OF THE INVENTION

This invention relates to overload protective systems and, in particular, to a novel overload protective system especially adapted for use on loads comprised in part of inductors having ferrous material cores.

Protective overload systems of the prior art, including those particularly suited to the protection of core type transformers, generally fall into either one, but not both, of the following categories: one category involves the insertion, in series, of a resistance between the load and the applied voltage on a temporary basis. Hence, when a voltage is applied across the serial connected load and resistance, the voltage across the load is smaller than it would be if the resistance were not in the circuit. Following such application, the resistance is effectively removed, as for example, by shorting, so that the full voltage is then applied across the load. The other category of system, which is likewise prevalent in the prior art, makes use of a zero crossover device such that a sinusoidal voltage is applied to the load at, or near, the time when the sinusoidal voltage is crossing the zero amplitude point. As is well known to those skilled in the art, a "zero crossover" device provides an indication when an A.C. signal passes thru zero, e.g., when it reverses polarity. By controlling the application time to correspond to a time when the amplitude is zero, or close to zero, the shock on the load is minimized.

As is well known, the permeability of a ferrous material of the type used to form transformer cores is not a constant. The permeability is usually represented by the symbol $\mu$. The value of $\mu$ is equal to the ratio B/H; where $B$ is the magnitude of the flux density, and where $H$ is the magnitude of the magnetizing force. When the ferrous material is at a completely demagnetized state and current is applied to a winding in association with such material, the value of H increases as a function of the current and the value of B rises, first rapidly and then more slowly. A chart of the relationship between B and H would be termed an initial magnetization curve. At sufficiently high values of H, the curve tends to become flat. This condition is called magnetic saturation. When the field applied to such a material is increased to saturation and then is decreased, the flux density B decreases but not as rapidly as it increased along the initial magnetization curve. Thus, when H reaches zero, there is a residual flux density, or remanence, $B\tau$. The phenomenon which causes B to lag behind H, so that the magnetization curve for increasing and decreasing fields is not the same, is called hysteresis, and a loop traced out by the magnetization curve is called a hysteresis loop. If the material is carried to saturation at both ends of the magnetization curve, the loop is called the saturation, or major, hysteresis loop. The residual flux density $B\tau$ of the saturation loop is called the retentivity, and the coercive force, $H_c$, of this loop, is called the coercivity. Thus, the retentivity of a substance is; the maximum value which the residual flux density can attain, and the coercivity of a substance is the maximum value which the coercive force can attain. For a given specimen, no points can be reached on the B/H diagram outside of the saturation hysteresis loop, but, any point inside can.

When an inductor having a ferrous material core has been left in a condition where the residual flux density is at a maximum, such as at $B\tau$ (or at an opposite polarity condition such as at $-B\tau$), then, when a voltage is applied across such a load in a direction which attempts to further saturate the core in the same direction, then the voltage applied thereacross would cause a relatively large current to flow through the inductor due to the fact that the inductor-core combination would be exhibiting a minimum impedance. In specific applications, an A.C. power source is connected to the power supply of a system through an off-on switch. When the A.C. power is applied to the power supply of the system, it is possible that the system's power transformer was left in a saturated condition, which condition, as previously stated, will cause an excessive amount of current to be drawn by the power transformer.

SUMMARY OF THE INVENTION

In accordance with the preferred embodiment of the present invention there is provided a means for applying an A.C. voltage to an inductive, ferromagnetic, type load at a time which corresponds substantially to the zero crossover time of the A.C. voltage. Additionally, there is provided a means for limiting the magnitude of the current drawn through the load for an initial portion of the applied A.C. voltage cycle.

More specifically, there is provided an inductive, ferromagnetic core, type load serially coupled to a current limiting resistance. A zero crossover detection device having input and output terminals is adapted to couple the A.C. voltage source to the load when the A.C. voltage is at or near the zero crossover point in its cycle. A switch means having an open and a closed state is connected across the current limiting resistance and is responsive to the output from the zero crossover device so as to maintain the switch in an open state during an initial portion of the A.C. voltage applied to the load. The switch means is adapted to exhibit a closed state after the initial period of application.

From the foregoing it can be seen that it is a primary object of the present invention to provide an improved overload protection device.

It is another object of the present invention to provide an overload protection device for systems of the type incorporating hysteresis loop characterizing devices.

It is another object of the present invention to provide a novel system for eliminating the problem of excessively large currents being drawn through an inductive core type load.

These and other objects of the present invention will become more apparent when taken in conjunction with the following description and drawings wherein like characters indicate like parts and which drawings form a part of the present invention.

DESCRIPTION OF THE PREFERRED EMBODIMENT

Figure 1:
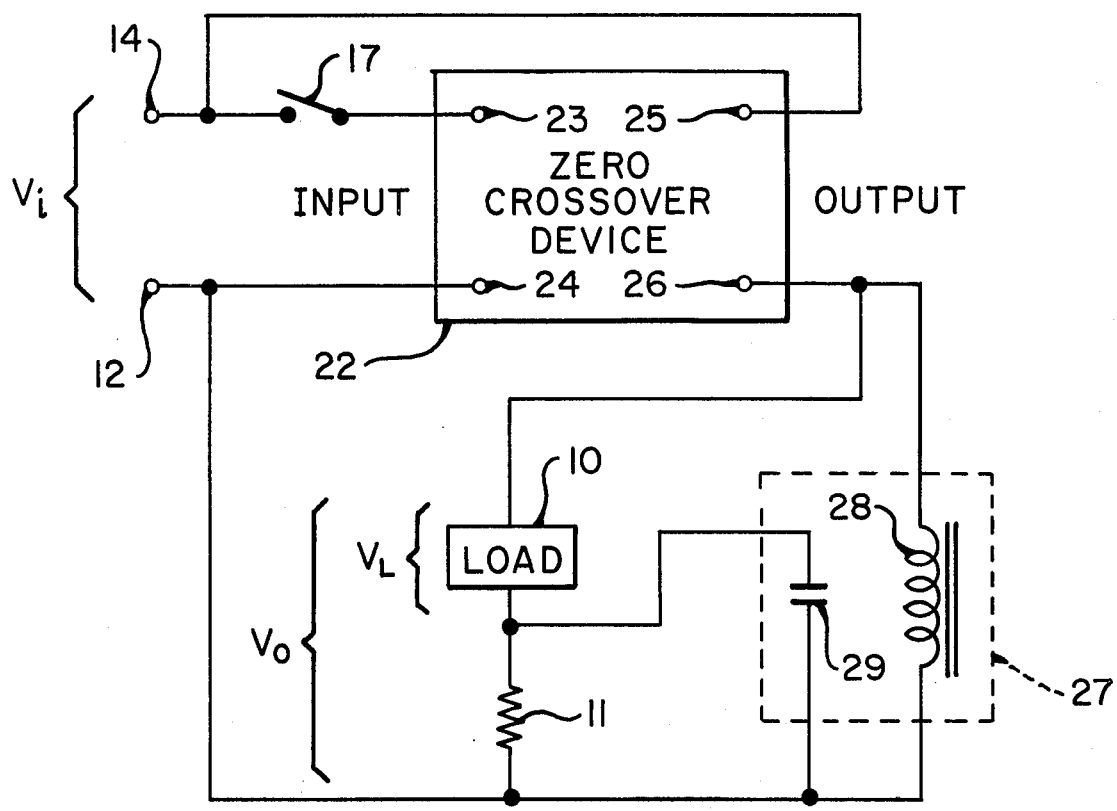
FIG. 1 is a block circuit diagram illustrating the preferred embodiment of the present invention.

Referring to FIG. 1, terminals 12 and 14 are adapted to be connected to an A.C. source designated $V_i$. A zero crossover device 22 having input terminals 23 and 24 is connected to terminals 14 and 12 respectively. An off-on switch 17 is interposed in the circuit path between terminals 14 and 23. The zero crossover device 22 has two output terminals 25 and 26. Terminal 25 is connected to terminal 14, bypassing switch 17, in order to receive circuit power for detecting the zero crossing of the voltage $V_i$. The output of the zero crossover device is taken from terminal 26. That output is connected to a load 10 and to a switch 27. Switch 27 may be a relay type switch comprised of an accuating coil 28 and a set of contacts 29. One end of coil 28, and a contact of switch 29, is connected to terminal 12. The load 10 is comprised of an inductor wound on a ferrous type material which constitutes a core. Generally speaking, the load will be a transformer, which transformer provides power to a particular system. The opposite end of the load 10 is connected to the terminal 12 by means of a resistance 11. Shunted across resistor 11 is the set of relay contacts 29. The contacts are accuated (closed) by the magnetic force generated when a current flows through coil 28. When the contacts are in the open position the resistance 11 is effectively in series with the load 10. The voltage across the load 10 is designated $V_L$ and the voltage across the load 10 and resistance 11 is designated $V_O$.

The zero crossover device 22 operates to sense the zero crossing of the A.C. voltage, $V_i$, applied to terminals 12 and 14 and at, or near, this crossing operates to connect the A.C. voltage to its output terminal 26. The response time of the relay 27 is such that the contacts 29 will remain in the open position for a predetermined period of time after the A.C. voltage appears on terminal 26. The amount of required open switch time is a function of the time it takes to drive the core of the load 10 from a fully saturated position, which position indicates a minimum impedance, to a non-saturated position having a substantially high impedance. Once the danger of drawing an excessive current through the load 10 has passed, the relay contacts 29 can be closed thus removing the effect of resistance 11 from the circuit. The zero crossover device 22, in the preferred embodiment, was a 120A25 manufactured by OPTO 22.

Figure 2:
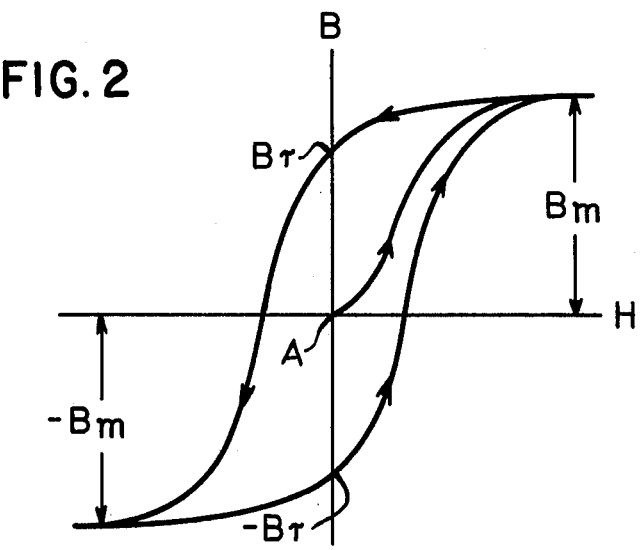
FIG. 2 is a hysteresis curve for a ferromagnetic material activated by a magnetic field.
Figure 4:
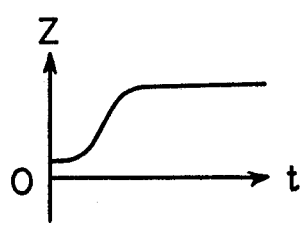
FIG. 4 is a diagram illustrating the plot of impedance, Z, for an inductor wound on a ferromagnetic core as a function of the time, $t$, elapsed from the application of a voltage applied with the same polarity as the polarity of the residual flux density.

FIG. 2 illustrates the standard hysteresis curve for a ferromagnetic type material. For a condition of no residual flux in the ferromagnetic material, the H and B curve will be at the intersect point indicated by the letter A. Upon the application of a current through the windings of a coil, associated with a ferromagnetic material, a magnetic field will be created, which field will cause the magnetization B to increase along the curve shown to the saturation level indicated at the value $B_m$. When the current through the coil ceases, the flux and the magnetization will move from the saturation level $B_m$ to the point $B_\tau$ intersecting the B axis. This particular point is described as the residual flux point. Now, if the current is interrupted and again applied in the same direction as first applied, the flux density will move from the residual flux point $B_\tau$ back along the hysteresis curve to reach the maximum amplitude point $B_m$. In this particular position the impedance of the inductor and the core is at a minimum value as shown, for example, in the waveform of FIG. 4. This particular condition will exist up until the current is reversed in polarity and for an A.C. signal this would be when it commences moving along its normal cyclic path. When the current is reversed, the flux density will move from the $B_m$ position through $B_\tau$ downwards towards $-B_m$. If, at the saturation point $-B_m$ the current ceases, the flux density will move along the hysteresis curve to the $-B_\tau$ point on the flux density axis B. This position would be equivalent to the negative residual flux point. In the operation of systems having power transformers and chokes, it is extremely inconvenient to turn the system off and assure that the flux density is at a zero value. Therefore, when the system is in a non-use condition there is, in all likelihood, a residual flux $B_\tau$, which flux can be either of a positive and/or negative value. When the A.C. power is applied to the transformer and/or choke, if the phasing of the power is such as to drive the flux density back along the hysteresis curve to the saturation position, then an extremely large and unusual amount of current will be drawn for a portion of the initial turn-on cycle.

Figure 3:
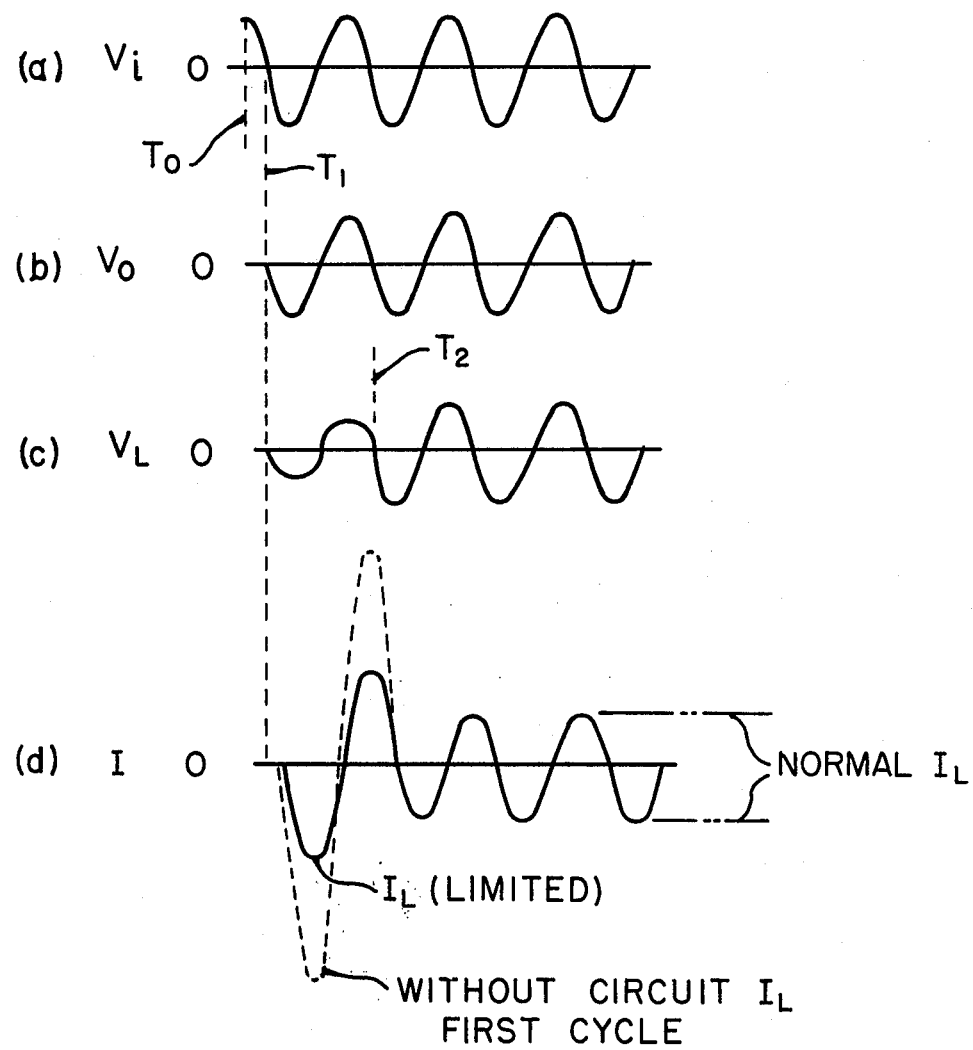
FIGS. 3a to 3d illustrate waveforms taken at strategic locations on the embodiment illustrated in FIG. 1.

Referring to FIG. 3, the waveform 3a illustrates the A.C. voltage $V_i$ applied to the input terminals 12 and 14. Closing switch 17 at time $T_o$ applies the A.C. voltage $V_i$ to the input terminals 23 and 24 at a maximum point in the cycle of the voltage waveform. The voltage $V_o$ across the load and resistance 11 remains at zero. At time $T_1$, the A.C. voltage $V_i$ crosses zero, which crossing is detected by the zero crossover detector 22 and, at the instant of such detection, $V_i$ is applied to the output terminal 26. It is to be noted then that the voltage $V_o$ starts at a zero value and builds according to the phase relationship of $V_i$. With the resistor 11 connected in series with the load 10, the voltage $V_L$ across the load 10 initially is at zero amplitude and then goes somewhat negative and then somewhat positive sinusoidally for one cycle, and then continues to go to the maximum points on the sinusoidal curve as depicted at FIG. 3c. With the reactive character of the load 10 and with the substantially low initial impedance of the load, the current through the load will take the form as shown in FIG. 3d, namely that the initial cycle of current that passes therethrough is higher than normal, but not to such a magnitude as to be undesirable. After the first cycle of current, at time $T_2$ relay 27 is activated and the contacts 29 are closed. Subsequent cycles of current and voltage are depicted as being normal.

It is understood that the relay coil and associated contacts can be replaced with solid state switch equivalents.

The foregoing described circuit eliminates an overload problem by utilizing an impedance in series with an inductive load during the initial turn-on of a system and by deleting the resistance when all danger of drawing a high current is past, while, in addition, the circuit assures that an A.C. voltage is applied to the load when the A.C. voltage is at a zero or near zero amplitude in its cycle.

Although the invention has been described and illustrated in detail, it is to be clearly understood that the same is not to be taken by way of limitation, the spirit and scope of this invention being limited only by the terms of the appended claims.

What is claimed is:

1. In an overload protection system for a circuit having
    an inductive load with a ferromagnetic material core:

means for initiating the application of an alternating voltage across said inductive load at substantially a zero crossover instant, comprising zero crossover means having an input and an output and being adapted to receive a sinusoidal voltage at its input and provide a sinusoidal voltage at its output at a time corresponding to the zero crossing of said sinusoidal voltage at its input; and means for limiting the magnitude of an initial portion of said applied alternating voltage across said inductive load, comprising an impedance connected in series with said inductive load, switch means shunting said impedance, and means responsive to the sinusoidal voltage at the output of said zero crossover means for closing said switch means a selected time after receipt of the sinusoidal voltage at the output.

2. The overload protection system according to claim 1, wherein said impedance comprises a resistor and wherein said means responsive to the sinusoidal voltage at the output of said zero crossover includes a relay coil.

* * * * *